No. 803,589. PATENTED NOV. 7, 1905.
E. V. HARTFORD.
ANTIVIBRATION DEVICE FOR VEHICLES.
APPLICATION FILED OCT. 1, 1904.
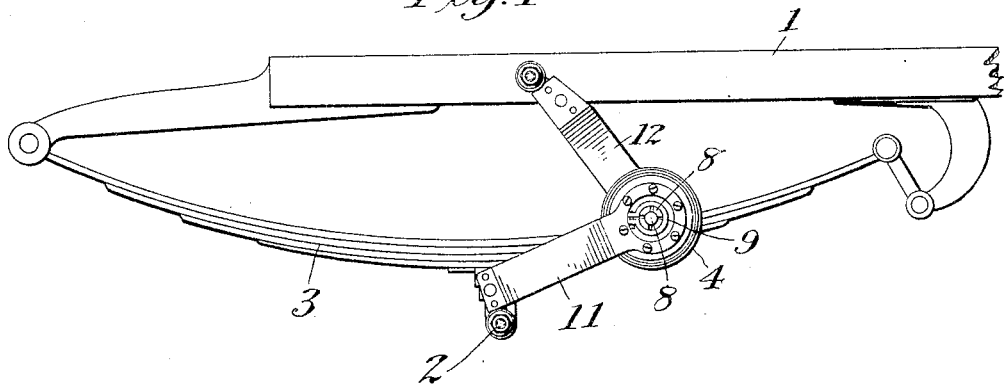
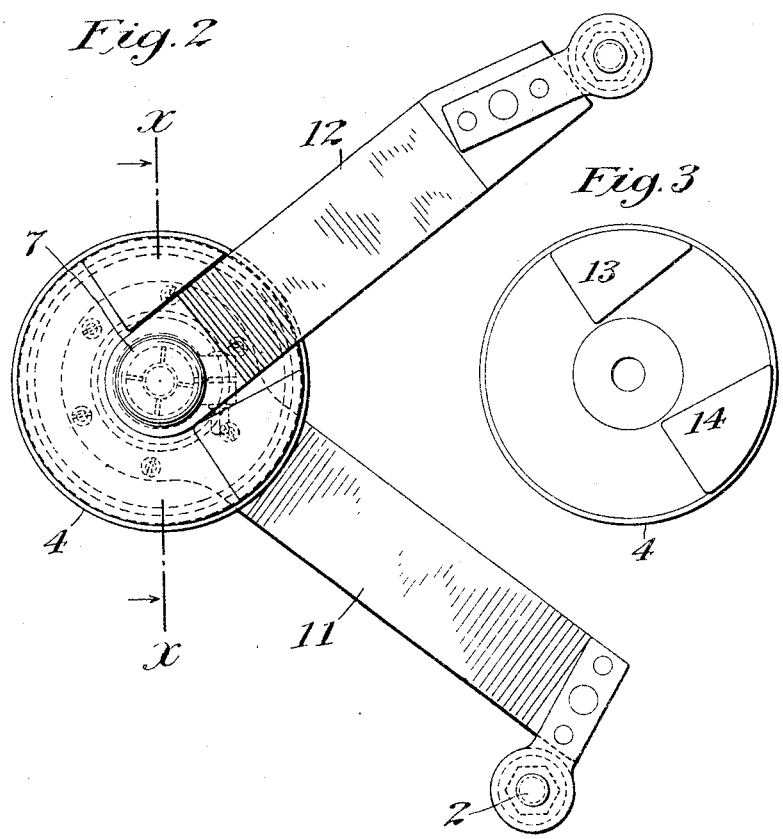
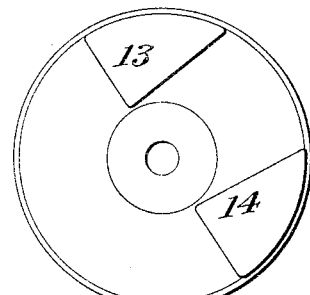
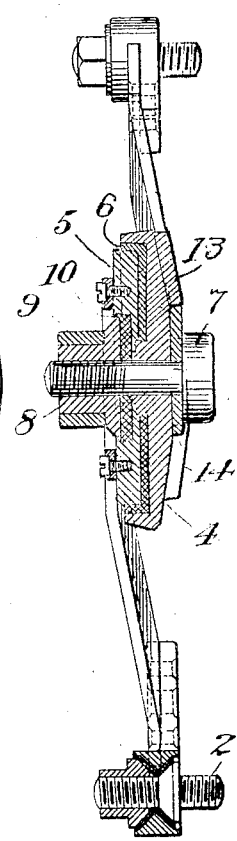
Witnesses:
Chas. D. King
Adolph P. Linze
Inventor:
Edward V. Hartford
by Dunn & Link
Att'ys.

UNITED STATES PATENT OFFICE.

EDWARD V. HARTFORD, OF NEW YORK, N. Y.

ANTIVIBRATION DEVICE FOR VEHICLES.

No. 803,589.     Specification of Letters Patent.     Patented Nov. 7, 1905.

Application filed October 1, 1904. Serial No. 226,863.

*To all whom it may concern:*

Be it known that I, EDWARD V. HARTFORD, a citizen of the United States, residing in New York city, county and State of New York, have invented certain new and useful Improvements in Antivibration Devices for Vehicles, of which the following is a full, clear, and exact specification.

Vehicles of the ordinary type usually comprise suitable running-gear, a suspended or body portion, and elastic suspending means, generally one or more springs between the running-gear and body portion, the object of this construction being to prevent the vibration of the running-gear caused by the inequalities or obstacles in the road from being communicated to the body or suspended portion. The springs used for this purpose when possessing sufficient elasticity to successfully prevent the transmission of vibration, however, are found to possess the attendant disadvantage of a quick recoil by reason of this very elasticity, causing a violent oscillation of the body, sometimes sufficient to materially interfere with the speed and generally causing the rapid deterioration of the vehicle. To prevent this disagreeable vibration of the springs, means have been devised for retarding their action, and the most successful method employed has been the use of a friction device interposed in such a way that the springs are permitted to oscillate, but reluctantly. One such device consists of two friction-disks having radial arms attached thereto, one of which arms is attached to the vehicle-body and the other to the axle thereof; but such devices having a uniform tension are not wholly successful in their operation, for the reason that while they will respond to any considerable oscillation such vibrations as are caused by a small obstacle or inequality in the road are not sufficiently powerful to overcome the friction, thus causing jolting and producing discomfort to the occupants of the vehicle, and it is to overcome this objection that my present improvement is designed. Generally it will be found that the slight vibrations will be sufficiently taken care of by the springs and it is only the greater ones that need be attended to. My present improvement, recognizing this feature, consists in an antivibration device which comprises friction means for retarding the action of the springs of a vehicle, but which permits of a small limited free movement thereof, the friction device being brought into operation only when the oscillation of the springs exceed a given predetermined amount.

My invention may be utilized and applied in various ways, and in the accompanying drawings I have illustrated but one form thereof.

In the drawings, Figure 1 represents a side elevation of my device as attached to the body and running-gear of a vehicle. Fig 2 is a rear view of the device upon a somewhat enlarged scale; Fig. 3, a plan view of the top of the disk shown in Fig. 2; and Fig. 4, a sectional view of the device, taken on lines $x$ $x$ of Fig. 2 and showing its interior detailed construction.

Similar reference-numerals indicate like parts in all the drawings.

In Fig. 1 the numeral 1 indicates the body portion of the vehicle. 2 indicates the axle forming part of the running-gear of the same, and 3 a spring forming the elastic suspension means between the body and the running-gear. In this figure my invention is shown applied as in use, and it comprises the recessed disk 4, the disk 5 of such a size as to fit in the recessed portion thereof, leaving sufficient space for the insertion of the friction material 6, which may be leather, fiber, rubber, or any other suitable material. The disks are secured together by means of the bolt 7 and the nut 8, the latter being locked in place by means of the adjustable sleeve 9. The said parts are generally similar to the construction shown in United States Letters Patent No. 743,995, granted to J. M. M. Truffault November 10, 1903, and need not be more particularly described herein. The nut, as will be seen, is seated upon a leather or fiber washer 10 and is adapted, in connection with the bolt 7, to adjust the tension between the disks to any desired degree. To the disk 5 is bolted or otherwise rigidly secured the arm or lever 11, by means of which it is adapted to be attached to the running-gear or body portion of the vehicle, suitable connecting means being provided—such, for instance, as is shown in the patent above mentioned—and adjacent to the disk 4 is mounted the other arm 12 in any suitable manner, such as shown, where one end is pivoted on the stud or bolt 7, it being permitted to rotate around such stud in the operation of the device. Upon the outer surface of the disk 4 and rigidly secured thereto or formed integral therewith are the lugs 13 and 14, between which the arm 12 is permitted a small or limited free movement; but by means of these lugs any movement of the arm beyond the predetermined amount will produce a movement of the disk 4, and thereby turn the friction-disk.

In operation, as will be readily understood, my device will permit a limited relative movement of the running-gear and body of the vehicle without any relative change of position, and therefore operation of the friction-disks, the arm 12 rocking on its pivot within the limits of the lugs 13 and 14; but any considerable oscillation causing a larger movement of the springs will cause the arm 12 to contact with one of the lugs of the disk 4 and turn the same, and thus brake or retard the oscillation of the spring in the manner desired.

It is obvious that many modifications and changes may be made in my invention without departing from the spirit thereof, and I do not intend to limit myself to the particular form or embodiment shown in the drawings; but

What I claim, and desire to secure by Letters Patent, is—

1. In a vehicle, comprising running-gear, a suspended portion and elastic supporting means between said running-gear and suspended portion, an antivibration device comprising non-elastic means for permitting of a limited free movement of the supporting means, but which operates to retard the recoil thereof beyond the limit of free movement, substantially as described.

2. In a vehicle comprising running-gear, a suspended portion and elastic supporting means between said running-gear and suspended portion, a frictionally-operated antivibration device, which, while permitting of a limited free movement of said supporting means, operates to retard the movement thereof beyond the limit of free movement, substantially as described.

3. In a vehicle comprising running-gear, a suspended portion and elastic supporting means between said running-gear and suspended portion, a non-elastic antivibration device which, while permitting free movement of said supporting means to a limited extent, operates to retard the recoil thereof beyond that point, and means for adjusting the resistance of the retarding means, substantially as described.

4. An antivibration device for vehicles comprising a friction device and an arm for operating the same, said arm being capable of a limited movement without operating said friction device, substantially as described.

5. An antivibration device for vehicles comprising a friction device and a plurality of arms attached thereto, one of said arms adapted to move on said device to a limited extent without operating the friction device, substantially as described.

6. An antivibration device for vehicles comprising a friction device possessing a plurality of arms one of which is connected to the suspended body of said vehicle and the other to the running-gear, one of said arms being adapted to have a limited movement upon said friction device, without operating same, substantially as described.

7. An antivibration device for vehicles comprising two connected members, movable relatively to each other and a friction substance between said members, an arm rigidly secured to one of said members and a second arm adapted after a limited amount of free motion to engage projections on the other member and to move said member, substantially as described.

8. An antivibration device for vehicles employing a supporting-spring between the parts relatively movable to each other, said antivibration device comprising frictional means between the parts, which provide a yielding resistance to movement, and retard the action of the spring and means whereby the parts of the vehicle may have a slight movement relative to each other without operating the said frictional means, substantially as described.

9. An antivibration device comprising friction-disks rotatable around a common center, a fixed arm secured to one of said disks and a second arm mounted so as to have a limited free movement but to engage and operate the other of said disks beyond this limited movement, and means for securing the friction-disks in operative position, substantially as described.

10. An antivibration device comprising friction-disks rotatable around a common center, a fixed arm secured to tone of said disks and a second arm mounted so as to have a limited free movement but to engage and operate the other of said disks beyond this limited movement, and adjustable means for securing the friction-disks in contact with each other, substantially as described.

11. An antivibration device comprising a recessed friction-disk, a second disk adapted to be seated in said recess, means for adjustably clamping the friction-disks in operative position, an operating-arm rigidly secured to one of said disks and a second arm mounted adjacent to the other of said disk and adapted to have a limited free movement but to engage lugs on said disk and move the same when operated beyond said limit of movement, substantially as described.

12. An antivibration device comprising a recessed friction-disk, a second disk located within said recess, friction material located between said disks, adjustable clamping means comprising a bolt and nut, friction material interposed between said nut and one of said disks an operating-arm rigidly secured to one of said disks and a second arm mounted adjacent to the other of said disks and having a limited free movement with respect thereto, but adapted to operate the disk beyond the limit of such free movement, substantially as described.

In testimony whereof I have hereunto set my hand in the presence of two subscribing witnesses.

EDWARD V. HARTFORD.

Witnesses:
   ADOLPH F. DINSE,
   A. C. FISCHER.